United States Patent [19]
Pearson

[11] 3,778,929
[45] Dec. 18, 1973

[54] PLANT GROW GUIDE

[76] Inventor: Theodore A. Pearson, 71 Hancock Ave., Newton Center, Mass. 02159

[22] Filed: July 12, 1971

[21] Appl. No.: 161,858

Related U.S. Application Data

[63] Continuation of Ser. No. 17,698, March 9, 1970, abandoned.

[52] U.S. Cl. .................................. 47/58, 47/47
[51] Int. Cl. ..................................... A01g 17/14
[58] Field of Search ............................... 47/47

[56] References Cited
UNITED STATES PATENTS
1,556,373  10/1925  Thoeni ............................. 47/47

FOREIGN PATENTS OR APPLICATIONS
10,985   0/1909   Great Britain
722,648  3/1932   France
344,255  3/1960   Switzerland
254,168  12/1948  Switzerland

*Primary Examiner*—Robert E. Bagwill
*Attorney*—David E. Hoppe

[57] ABSTRACT

Many plants grown in pots require stacking and binding at a time near their maturity. A self-positioning collar is set in the pot with a stake when the plants are small. As the plants grow the collar is raised along its stake by the plant growth, adjusting to the changing size of the plants. At maturity, the potted plants are supported and retained by the staked collar which prevents the individual plants from bending too far away from the pot, thereby presenting a neat and unified appearance for the potted plant, and making the potted plant easy to secure and handle.

4 Claims, 5 Drawing Figures

*INVENTOR.*
THEODORE A. PEARSON

*INVENTOR.*
THEODORE A. PEARSON
BY *David C. Hoppe*
ATTORNEY

PLANT GROW GUIDE

This application is a continuation of U.S. Patent Application Ser. No. 17698, filed Mar. 9, 1970, and now abandoned.

This invention relates to retainers for plants and more particularly to a self-leveling retaining collar used in conjunction with a stake for managing and supporting a group of plants grown in a pot so that the need for binding up the potted plant at its maturity is eliminated.

Large numbers of potted plants are grown by the floral industry. Many of the most popular varieties, such as crysanthemums, are raised in the form of 4–8 individual seedlings or cuttings placed into a pot, the plants growing to maturity thereafter. Because of the bulk of the mature crysanthemum plant, as the flowers develop and become heavy they exhibit a tendency to tip away from the pot and perhaps break at the base of the plant stems. To manage the mature plant grouping, it is customary to insert a plurality of stakes about the periphery of the pot and to wrap a string about the entire combination of stakes and plants, thereby stabilizing and supporting the plant grouping. To perform this operation on a potted plant may require a minute or so of time. Where a large grower produces thousands of potted plants each week, it may be appreciated that an enormous amount of labor may be consumed in the performance of this staking and binding operation. It has long appeared advantageous if some means could be provided to eliminate this expenditure of labor upon each potted plant, while still providing for appropriate management of the mature plant grouping wherein the grouping is effectively staked and bound at its maturity.

Accordingly, the present invention provides means for automatically retaining and supporting a plant grouping during its growth so that at maturity the plant grouping is effectively staked and bound. This is accomplished through the provision of a fixed stake centered within a slidable collar, the collar being free to move slidably along the stake length, and the combination of stake and collar being set into place at a time when the individual plants are yet young and are only partially grown. As the plants grow, offshoots interact with portions of the collar to reposition the collar upwards along the stake, the collar being moved by the plant slidably upwards along the fixed stake. At maturity, the collar is nicely intertwined with grown portions of the plants and positioned at a level on the fixed stake appropriate for the proper retention of the plant stems.

These and other objects of the invention will be readily apparent from the following description taken in conjunction with the drawings in which.

Figure 1:
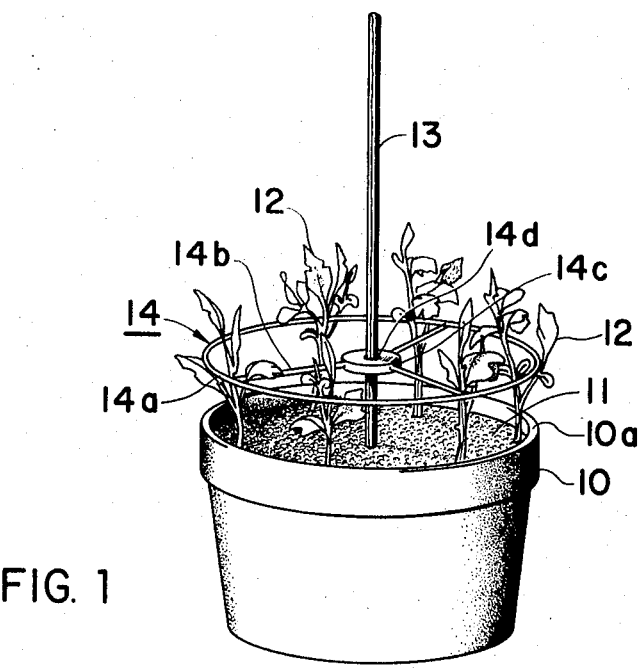
FIG. 1 is a three-dimensional view of a stake and collar placed in conjunction with a pot of seedlings, cuttings, bulbs, or partially grown plants.

Referring now to FIG. 1, pot 10 is typically made from plastic. Earth 11 is provided with pot suitable for the intended plants. Seedlings or cuttings 12 are typically transplanted into pot 10-earth 11, having been grown to the seedling stage in greenhouses. It is also possible to grow plants from seeds in pot 10, if this approach should be desired.

At the time of seedling, cutting, or plant transplant, or when the seedlings or cuttings 12 are only several inches high, the combination of stake 13-collar 14 is applied to pot 10-earth 11. Stake 13 is inserted directly into earth 11 at the center of pot 10 to a sufficient depth to centrally support collar 14 together with the plant weight that eventuates during growth. Collar 14, consisting of peripheral member 14a, connecting members 14b, and hub 14c with central aperture 14d, is thereupon dropped over stake 13 which is placed through aperture 14d. Aperture 14d is large enough to slip along the length of stake 13 without any appreciable friction, aperture 14d being conveniently somewhat larger than the diameter of stake 13. Alternatively, stake 13 may be inserted with collar 14 already placed thereon. It has been found convenient to apply the combination of stake and collar by putting collar 14 on the young plant growth in the desired position and then inserting stake 13 through aperture 14d of collar 14 into earth 11 of pot 10.

The diameter of collar 14, defined by the size of periphery 14a, is most conveniently of the same size as the diameter of pot 10. In general, most growth applications require pots 10 of from 5 to 7 inches diameter. Accordingly, the diameter of collar 14 will in most cases be from 5 to 7 inches to match the size of pot employed. It is to be understood that the invention may be employed with either larger or smaller pots, with the collar portion being appropriately sized thereto.

Stake 13 is most conveniently and inexpensively made of wood, a length of squarely-split bamboo being popular for staking applications generally. The user of this invention may readily provide his own stakes from available stock supplies of these materials. A ¼ inch diameter of stake 13 is frequently used, smaller diameters being usable with smaller potted plants.

Figure 2:
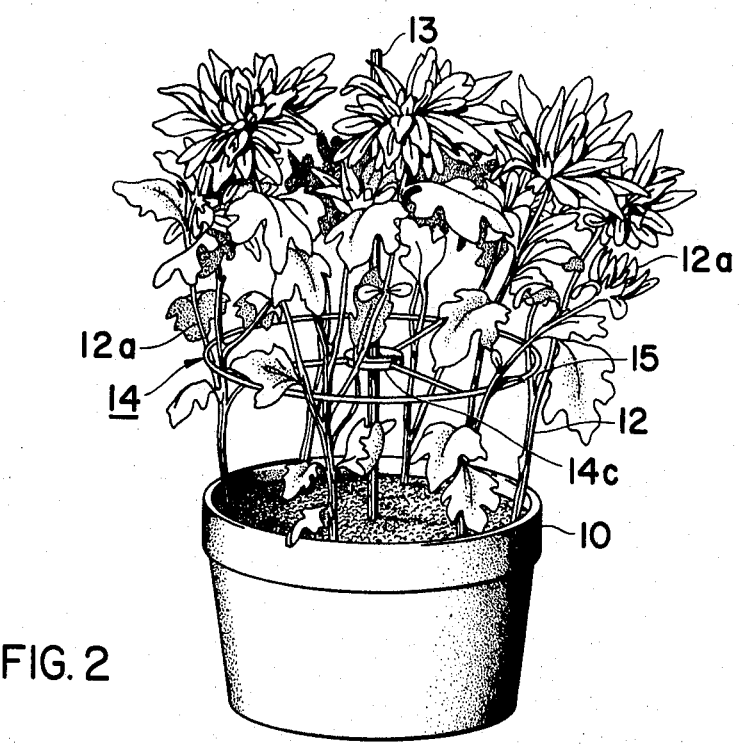
FIG. 2 is a three-dimensional view of the location of the collar with respect to the stake and the plants at plant maturity.
Figure 3:
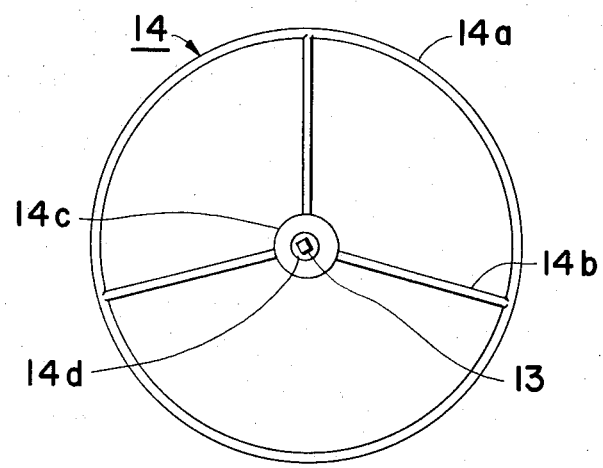
FIG. 3 is a plan view of a retaining collar.
Figure 4:
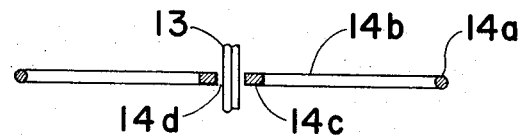
FIG. 4 is a side view of a typical collar.
Figure 5:
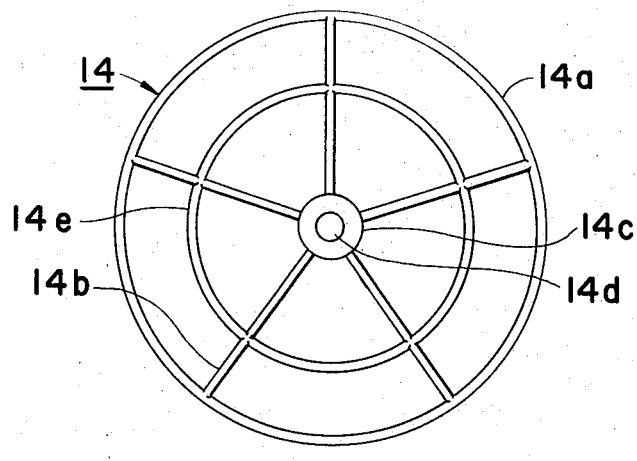
FIG. 5 is a plan view of another collar having a differing number of spokes for positioning the hub and an additional ring.

Collar 14 may readily be fabricated from plastic or other convenient material such as fiberboard, for example. The ring 14a and connecting members 14b may be about ⅛ inch cross-section, and hub 14c only large enough to support the remainder. FIGS. 1–3 illustrate collar 14 with three connecting members 14b each, but it is to be understood that any convenient number may be employed; FIG. 5 shows collar 14 with five connecting members 14b. It will be appreciated that connecting members 14b, exemplified in FIGS. 1–5 may conveniently coincide with radii of the circle defined by peripheral member 14a. It will also be appreciated that members 14b function to position ring 14a with hub 14c, so that members 14b may be also of any configuration other than radial spokes serving such function. For example, the spirally-shaped spokes of the handles of the old valves will serve as well. Also, some kind of patterned network such as diamond-shaped mesh could serve the function of positioning ring 14a with hub 14c. While what is considered to be the best mode of the invention is shown and described, it will be appreciated that the invention may be practised by employing stakes and collars of altered appearance from those shown. What is essential is that collar 14, of whatever configuration, have a hub 14c free to move along stake 13, and that ring 14a be positioned with hub 14c by some form of connecting members 14b, not necessarily or limited to the form shown. FIG. 4 shows a cross-sectional view of collar 14 and stake 13, more clearly showing the relationship of hub 14c-aperture 14d to stake 13. Additional rings 14e inward of peripheral ring 14a may be provided as convenient.

When stake 13-collar 14 are first applied, collar 14 may rest directly upon lip 10a of pot 10, if seedlings 12 are not large enough to support the weitht of collar 14. It will be more convenient to apply collar 14 at a time when seedlings 12 have become of sufficient size to bear the weight of collar 14. The application of collar 14 at this latter time will find collar 14 supported by portions of seedlings 12 sprouting under and to either side of ring 14a and connections members 14b.

To some extent the upward growth of plants 12 carries collar 14 upwards. At maturity, portions of plants 12 are found outside peripheral ring 14a, while the main bulk of plants 12 are found within peripheral ring 14a. The effective intertwining provided thereby insures a stable plant and retainer assemblage, plants 12 being managed from falling outwardly from pot 10. In that the total assemblage of plants 12 tend to fall in differing direction about pot 10, the net effective pull from stake 13 in any direction is minimal, adding to the stability of the completed mature product.

It is found that the invention is suitable for use with many types of plants having relatively weak basal stems in the region of emergence from the earth in relationship to the plant bulk above the basal stem region. For example, the Hydrangea when mature carries an enormous bulk in its flowers which would endanger its stem under the least amount of stress. The invention is conveniently applied to the young plant subsequent to a "pinching" operation wherein early flower buds are removed. A new generation of buds is thereby stimulated to grow, several in a group at the site of each bud pinching. It is found that the invention provides ideal support when collar 14 is positioned with the bud system of the Hydrangea so that some of the growing buds are to the inner side of ring 14a and some buds sprout outside of ring 14a.

It is found that natural green or other natural colors for the stake and collar make for an inconspicuous and pleasing appearance of the mature plant, as compared with the present method of peripheral stakes and all-around string binding.

What is claimed is:

1. Plant supporting means comprising a plant pot for growing media and a plurality of plants therein, said plants being spaced in said media generally about and adjacent the periphery of said pot, there being received in said media a stake extending thereabove, and a collar comprising an apertured hub member, and connecting members joining said hub and peripheral member, said hub member being freely received on said stake and being slideable thereby therealong at least a portion thereof, said peripheral member being positioned on said plants, whereby the plant growth will slideably move said collar along said stake and portions of said plants are confined within the confines of said peripheral member, connecting members and hub member, to restrain outward movement thereof.

2. The combination of claim 1 with the overall diameter of said collar being in the range of 5 to 7 inches.

3. The combination of claim 1 wherein said collar is formed integrally from a plastic type of material.

4. In the method of managing and training pot plants, wherein a plurality of plants are grown about the periphery of a pot so as to provide a generally circular array thereof, and confining means are provided against the stems and foliage of said plants to limit the lateral movement thereof, the improvement comprising, confining said plants by placing a generally ring-shaped structure on the growing tips of said plants when the same are in a predetermined immature stage, said structure being freely and slideably received at a generally central portion thereof on a stake secured in said pot, the placement of said structure being such that the major portion of said stems and foliage are confined within said structure as said tips grow against said structure and thereby slide said structure along said stake.

* * * * *